(12) United States Patent
Kim

(10) Patent No.: US 7,753,579 B2
(45) Date of Patent: Jul. 13, 2010

(54) LIGHT GUIDE PLATE, BACK LIGHT ASSEMBLY HAVING THE SAME AND DISPLAY APPARATUS HAVING THE SAME

(75) Inventor: Jae-Kwang Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 664 days.

(21) Appl. No.: 11/257,746

(22) Filed: Oct. 25, 2005

(65) Prior Publication Data

US 2006/0087867 A1    Apr. 27, 2006

(30) Foreign Application Priority Data

Oct. 25, 2004    (KR) .................... 10-2004-0085470

(51) Int. Cl.
*F21V 7/01* (2006.01)

(52) U.S. Cl. .............. 362/620; 362/628; 362/625; 362/617; 362/623; 362/621; 362/606; 362/619; 362/225; 362/224; 362/330

(58) Field of Classification Search ......... 362/600–634, 362/561
See application file for complete search history.

(56) References Cited

U.S. PATENT DOCUMENTS

| | | | | |
|---|---|---|---|---|
| 5,711,589 A | * | 1/1998 | Oe et al. ................. | 362/620 |
| 6,239,851 B1 | * | 5/2001 | Hatazawa et al. ........... | 349/62 |
| 6,679,613 B2 | * | 1/2004 | Mabuchi .................... | 362/600 |
| 7,018,088 B2 | * | 3/2006 | Yu et al. .................... | 362/620 |
| 7,066,634 B2 | * | 6/2006 | Kitamura et al. ........... | 362/616 |
| 7,090,389 B2 | * | 8/2006 | Parker et al. ............... | 362/627 |
| 7,128,460 B2 | * | 10/2006 | Hosobuchi ................. | 362/626 |
| 2002/0181223 A1 | * | 12/2002 | Ryu et al. .................. | 362/31 |
| 2004/0090765 A1 | | 5/2004 | Yu et al. | |
| 2004/0184257 A1 | * | 9/2004 | Huang ...................... | 362/31 |
| 2004/0264211 A1 | * | 12/2004 | Han et al. .................. | 362/561 |

FOREIGN PATENT DOCUMENTS

| | | |
|---|---|---|
| CN | 2613784 | 4/2004 |
| CN | 1515937 A | 7/2004 |
| CN | 1580901 A | 2/2005 |
| JP | 08190023 | 7/1996 |
| JP | 2002-109935 A | 4/2002 |
| JP | 2004-227856 A | 8/2004 |

* cited by examiner

*Primary Examiner*—Sandra L O'Shea
*Assistant Examiner*—Jessica L McMillan
(74) *Attorney, Agent, or Firm*—Cantor Colburn LLP

(57) ABSTRACT

In a light guide plate and a display apparatus having the light guide plate, the light guide plate includes an incident face and a first exiting face. The incident face receives a light provided from an exterior. The first exiting face includes a first area and a second area. A first light-controlling pattern is formed in the second area. The first exiting face guides the incident light to the first area by the first light-controlling pattern and exits the guided light.

31 Claims, 15 Drawing Sheets

LIGHT GUIDE PLATE, BACK LIGHT ASSEMBLY HAVING THE SAME AND DISPLAY APPARATUS HAVING THE SAME

The present application claims priority to Korean Patent Application No. 2004-85470 filed on Oct. 25, 2004, the contents of which are incorporated herein by reference in its entirety.

BACKGROUND OF THE INVENTION

1. Field of the Invention

The present invention relates generally to a light guide plate, a back light assembly having the light guide plate and a display apparatus having the light guide plate. More particularly, the present invention relates to a light guide plate capable of improving a display quality, a back light assembly having the light guide plate, and a display apparatus having the light guide plate.

2. Description of the Related Art

In general, a display apparatus includes a liquid crystal panel including a liquid crystal layer disposed between lower and upper substrates. The display apparatus displays images by changing an alignment of liquid crystal molecules when a voltage is applied to the liquid crystal layer.

The liquid crystal display (LCD) apparatus is a passive type display apparatus, in that it either reflects light transmitted through the liquid crystal display panel for displaying an image, or it may include a light source, for example, a back light assembly disposed at a rear side of the liquid crystal display panel for displaying an image.

The backlight assembly includes the light source, a light guide plate guiding a light emitted from the light source to the liquid crystal display panel, a reflective sheet disposed under the light guide plate to reflect a light leaked from the light guide plate to the light guide plate again, and an optical sheet to enhance a brightness of a light from the light guide plate. Examples of the optical sheet include a diffusion plate, a prism sheet, etc.

In a small scale liquid crystal display apparatus to which a light emitting diode (LED) is employed, a bright light exiting from the light emitting diode is directly provided to the light guide plate, causing a bright line or a shadow to be generated in a display panel adjacent to the light emitting diode.

SUMMARY OF THE INVENTION

The aforementioned disadvantages are overcome or eliminated by a back light assembly capable of improving a display quality.

The present invention also provides a back light assembly including the above light guide plate.

The present invention further provides a display apparatus including the above light guide plate.

In accordance with one aspect of the present invention, there is provided a light guide plate including an incident face and a first exiting face. The incident face receives a light provided from an exterior. The first exiting face includes a first area and a second area on which a first light-controlling pattern is formed. The first exiting face guides the light toward the first area through the first light-controlling pattern.

The light guide plate may further include a second face having a third area and a fourth area on which a second light-controlling pattern is formed. The second face guides the light toward the third area through the second light-controlling pattern.

A distribution density of the first light-controlling pattern becomes greater as further the first light-controlling pattern is spaced apart from the incident face, whereas a size of the first light-controlling pattern becomes smaller as further the first light-controlling pattern is spaced apart from the incident face. The first light-controlling pattern includes a recess having a substantially groove shape or a substantially dot shape, and the first light-controlling pattern is formed substantially in parallel with the incident face. The first light-controlling pattern includes a plurality of protruded patterns with respect to a surface of the exiting face. Alternatively, the first light-controlling pattern includes a plurality of recessed patterns with respect to the surface of the exiting face.

The first light-controlling pattern has a plurality of curved shaped patterns arranged one after another or substantially zigzag-shaped patterns when viewed on a plane.

In accordance with another aspect of the present invention, there is provided a back light assembly including a light source and a light guide plate. The light source generates a light. The light guide plate includes a first light-controlling pattern formed in a first area adjacent to an incident face. The light guide plate includes a first exiting face through which a light advances towards an area except for the first area by the first light-controlling pattern. Also, The back light assembly includes a first optical member to uniformize brightness of the exiting light from the first exiting face.

The light guide plate further includes a second exiting face. The second exiting face has a second area adjacent to the incident face. A second light-controlling pattern is formed in the second area. The second exiting face emits the light through an area except for the second area by the second light-controlling pattern. Also, The back light assembly includes a second optical member to uniformize brightness of the exiting light from the second exiting face.

The backlight assembly further includes a transflective member to reflect a portion of a second light from the second exiting face and transmit a remaining portion of the second light. The light source includes a plurality of point light sources.

In accordance with still another aspect of the present invention, there is provided a display apparatus including a first display panel and a back light assembly. The first display panel includes a first display area to display an image and a first light blocking area to block light. The back light assembly includes a light guide plate. The light guide plate includes a first exiting face having a first light-controlling pattern formed on the first exiting face, and the first exiting face corresponds to the first light blocking area. The light from the light source exits from the first exiting face of the light guide plate to the first display panel.

The display apparatus further includes a second display panel having a second display area to display image and a second light blocking area to block the light. The light guide plate further includes a second exiting face having a second light-controlling pattern formed on the second exiting face, and the second exiting face corresponds to the second light blocking area.

The display apparatus further includes a transflective member and a reflecting member. The transflective member reflects a portion of the light and transmits a remaining portion of the light. The reflecting member has an opening corresponding to a size of the second display panel, and is disposed between the transflective member and the second display panel. The reflecting member partially reflects the transmitted light through the transflective member to apply the reflected light to the light guide plate.

According to the above, the display apparatus of the exemplary embodiments eliminates a bright line and/or a dark area otherwise generated by existing display apparatuses, thereby preventing deterioration of its display quality.

BRIEF DESCRIPTION OF THE DRAWINGS

The above and other features and advantages of the present invention will become readily apparent by reference to the following detailed description when considered in conjunction with the accompanying drawings wherein.

DETAILED DESCRIPTION OF THE INVENTION

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
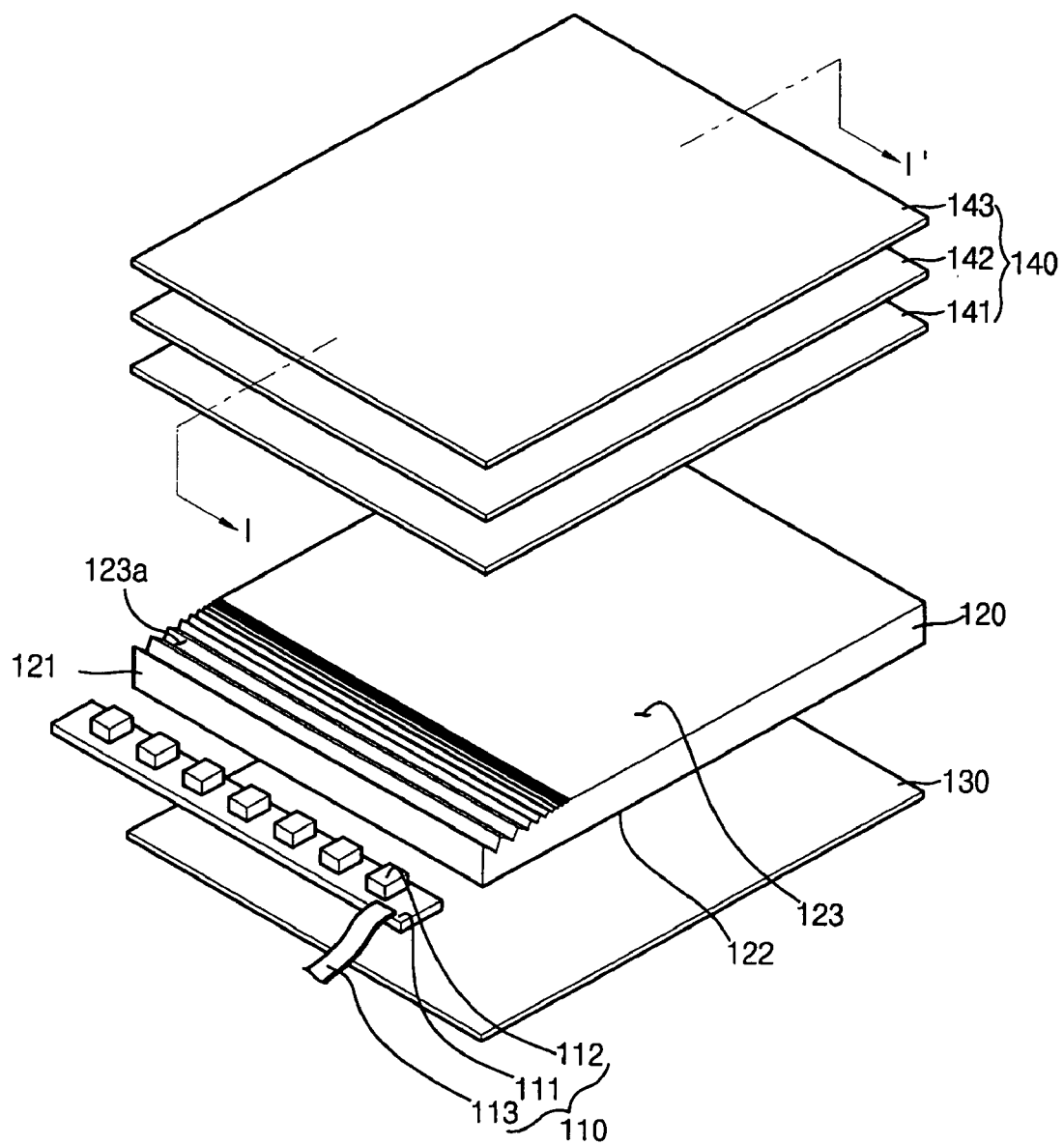
FIG. 1 is a perspective view illustrating a back light assembly in accordance with an exemplary embodiment of the present invention.

FIG. 1 is a perspective view schematically illustrating a back light assembly in accordance with an exemplary embodiment of the present invention.

Referring to FIG. 1, a backlight assembly includes a light generating part 110, a light guide plate 120, a reflecting member 130 and an optical member 140.

The light generating part 110 includes a printed circuit board 111, a light source 112 having a plurality of light emitting diodes and a flexible printed circuit board 113. The light emitting diodes are mounted on the printed circuit board 111. The flexible printed circuit board 113 electrically connects the light emitting diodes 112 to the power supply (not shown) to apply a driving voltage to the light emitting diodes 112. In alternative exemplary embodiments, the light source may be a linear lamp.

The light guide plate 120 is disposed between the reflecting member 130 and the optical member 140. A printed pattern (not shown) and an etched pattern (not shown) are formed on a first face 122 of the light guide plate 120 to apply light incident into the light guide plate 120 from the light emitting diodes 112 to a second face 123 of the light guide plate 120 corresponding to the first face 122. A light-controlling pattern 123a is formed on the second face 123 of the light guide plate 120. The light-controlling pattern 123a is formed in an area adjacent to an incident face 121 of the light guide plate 120. The area faces a light blocking area of a display panel (not shown) that is disposed on the light guide plate 120. In exemplary embodiments, the light-controlling pattern 123a may include, for example, various patterns such as a groove pattern, a dot pattern, an etched pattern, etc., and the light-controlling pattern 123a guides the incident light emitted from the light emitting diodes 112 to a display area of the display panel.

The reflecting member 130 is disposed under the first face 122 of the light guide plate 120 to reflect any light leaked from the light guide plate 120 back to the light guide plate 120. The reflecting member 130 may have, for example, a plate-like shape, a sheet-like shape, etc.

The optical member 140 is disposed on the second face 123 of the light guide plate 120 to uniformize a brightness of the light that is guided by the light guide plate 120. The optical member 140 may include a diffusion sheet 141, a first prism sheet 142 and a second prism sheet 143.

Figure 2:
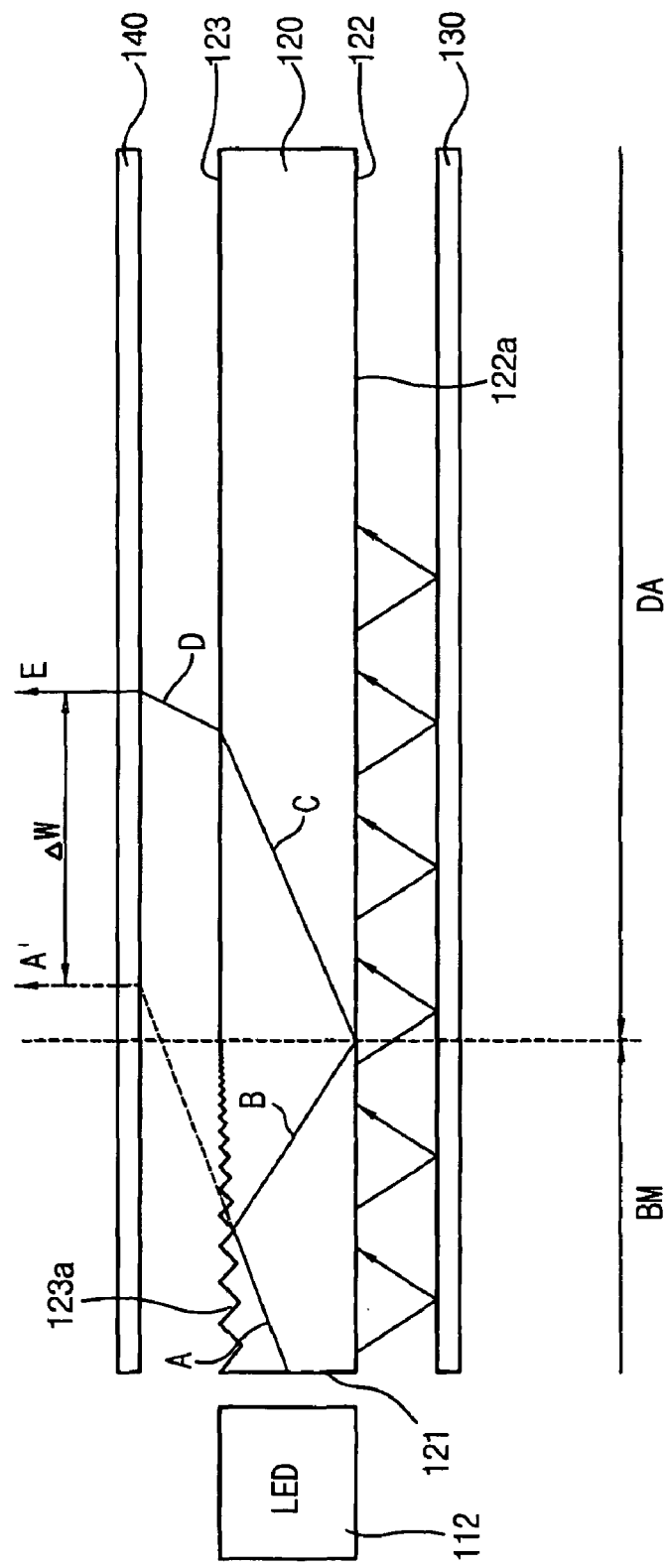
FIG. 2 is a cross-sectional view taken along line I-I' in FIG. 1.

FIG. 2 is a cross-sectional view taken along line I-I' in FIG. 1.

Referring to FIGS. 1 and 2, the light emitted from the light emitting diodes 112 is guided through the light guide plate 120 to advance toward the reflecting member 130 and the optical member 140. The reflecting member 130 reflects light that has leaked from the light guide plate 120 back to the light guide plate 120, and the optical member 140 uniformizes the brightness of the light exiting from the light guide plate 120.

The printed and etched patterns are formed on the first face 122 of the light guide plate 120. The light-controlling pattern 123a is formed in the area of the second face 123 that is adjacent to the incident face 121. The area corresponds to the light blocking area (BM) of the display panel (not shown) disposed on the light guide plate 120. In exemplary embodiments, the light-controlling pattern 123 may be formed in the area such that its size and/or distribution densities vary over the distance of the area. In the embodiment shown in FIG. 2, for example, a size of the light-controlling pattern 123a becomes smaller as the distance from the incident face 121 increases, whereas a distribution density of the light-controlling pattern 123a becomes greater as the distance from the incident face 121 increases.

In addition to the incident light, a first light 'A' directly applied to the second face 123 of the light guide plate 120 through the incident face 121 is changed into a second light 'B' by the light-controlling pattern 123a formed on the second face 123 of the light guide plate 120. The second light 'B' is changed into a third light 'C' by the etched pattern 122a formed on the first face 122 of the light guide plate 120, and the third light 'C' advances toward the second face 123 through the second face 123 of the light guide plate 120. A fourth light 'D' exiting from the second face 123 is condensed as a fifth light 'E' by the optical member 140 and exits from the optical member 140.

Accordingly, the first light 'A' directly applied to the second face 123 of the light guide plate 120 is guided by the light-controlling pattern 123a and is ultimately changed to form the fifth light 'E'. Had the light-controlling pattern 123a not been formed on the light guide plate 120, the first light 'A' directly applied to the second face 123 would instead be changed into a sixth light 'A'' to generate a bright light.

Therefore, the first light 'A' is shifted to a display area by a distance ΔW by the light-controlling pattern 123a formed on the second face 123 and exits from the light guide plate 120.

Hereinafter, various exemplary embodiments of the light-controlling patterns formed on the second face 123 of the light guide plate 120 will be described.

Figure 3:
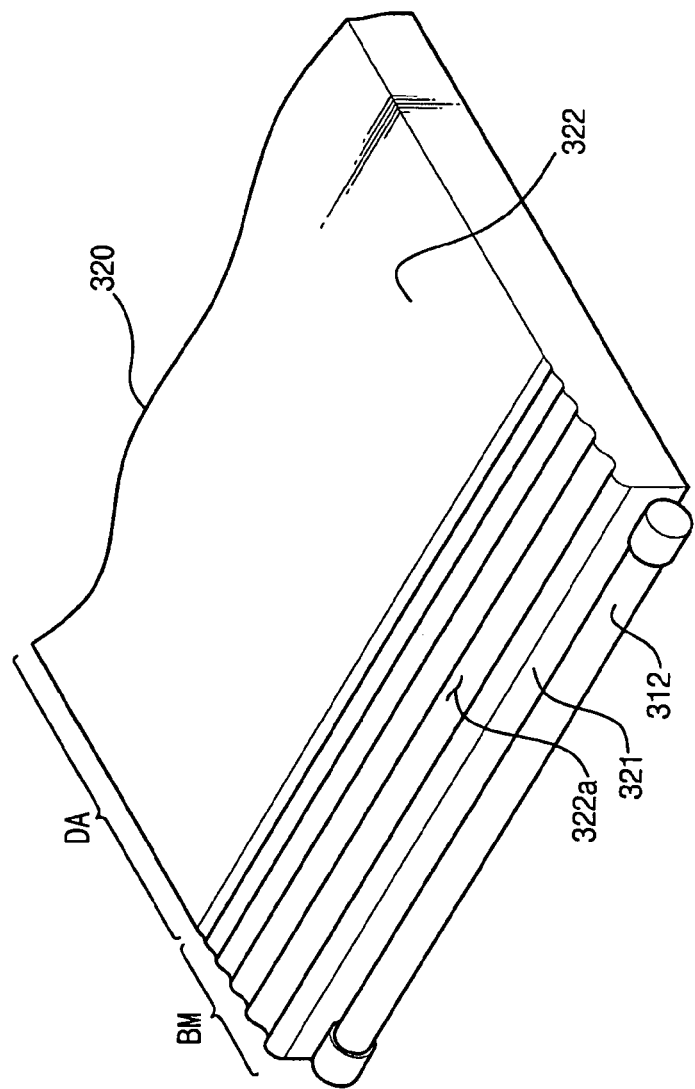
FIG. 3 is a perspective view illustrating a light guide plate in accordance with an exemplary embodiment of the present invention.

FIG. 3 is a perspective view illustrating a light guide plate in accordance with an exemplary embodiment of the present invention.

Referring to FIG. 3, a light guide plate 320 guides a light emitted from a light source 312 to an exiting face 322 of the light guide plate 320. A light-controlling pattern 322a having a groove shape is formed on the exiting face 322. The light-controlling pattern 322a is formed in an area of the exiting face 322 corresponding to a light blocking area BM of a display panel (not shown) disposed on the light guide plate 320.

The light-controlling pattern 322a may have a substantially corrugated-shape when viewed in a cross-section. In exemplary embodiments, the light-controlling pattern 322a may be formed in an area of the second face 332 such that its size and/or distribution densities vary over the distance of the area. The area corresponds to the light blocking area (BM) of a display panel (not shown). For example, the size of the light-controlling pattern 322a may become smaller and the distribution density of the light-controlling pattern 322a may become greater as the distance from the incident face 321 increases. In alternative embodiments, the size and the distribution density of the light-controlling pattern 322a may be constant regardless of the position of the light-controlling pattern 322a. In yet further embodiments, the size and the distribution density of the light-controlling pattern 322 may become greater as the distance from the incident face 321 increases. The light-controlling pattern 322a may have, for example, a substantially triangular prism shape when viewed in a cross-section.

Figure 4:
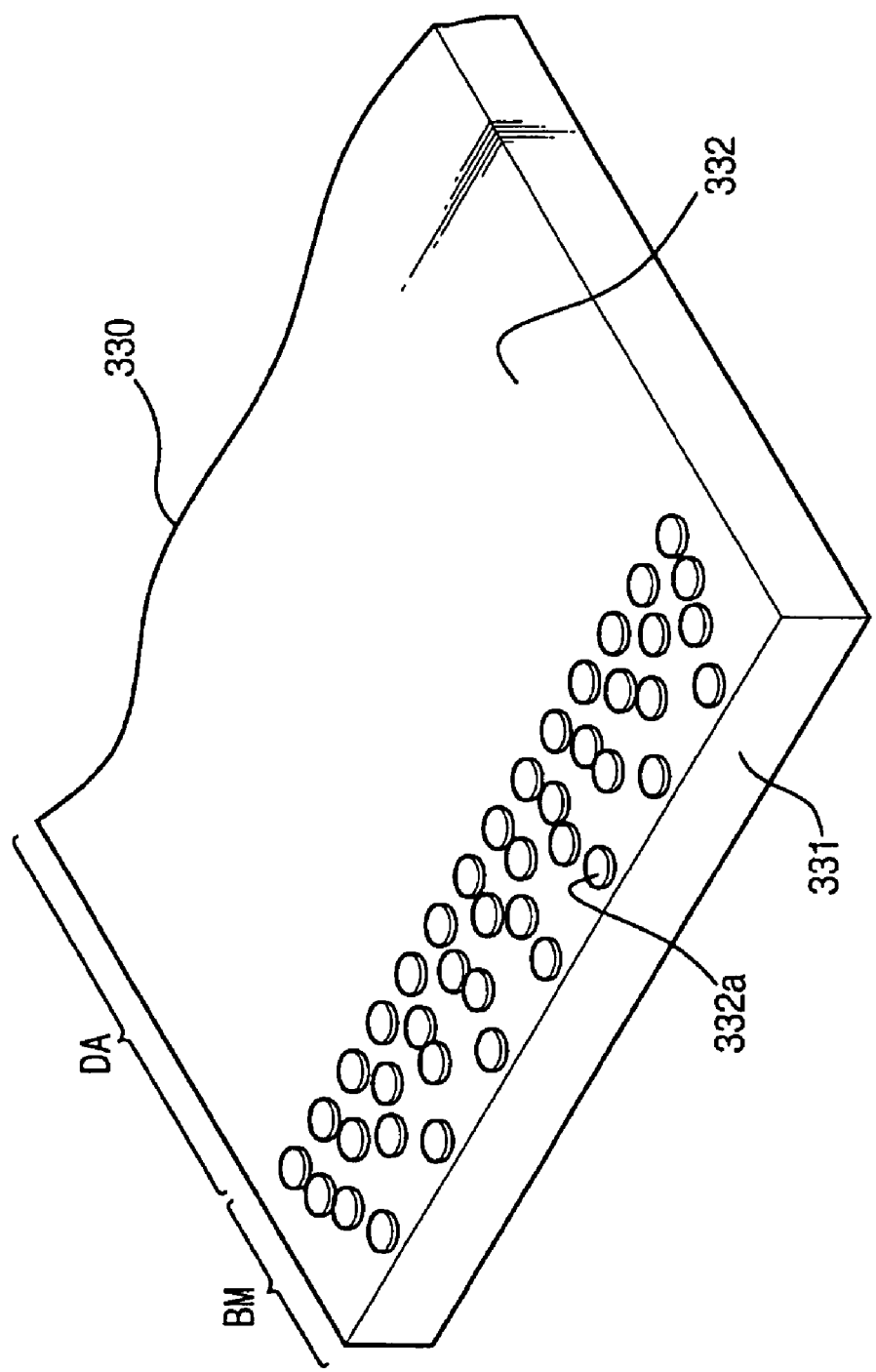
FIG. 4 is a perspective view illustrating a light guide plate in accordance with another exemplary embodiment of the present invention.

FIG. 4 is a perspective view illustrating a light guide plate in accordance with another exemplary embodiment of the present invention.

Referring to FIG. 4, a light-controlling pattern 332a has a substantially dot shape when viewed on a plane, and is formed on an exiting face 332 of a light guide plate 330 in an area adjacent to an incident face 331.

The light-controlling pattern 332a may have, for example, a substantially rectangular shape when viewed in a cross-section. In exemplary embodiments, the light-controlling pattern 332a may be formed in an area of the exiting face 332 such that its size and/or distribution densities vary over the distance of the area. The area corresponds to the light blocking area (BM) of a display panel (not shown). For example, the size of the light-controlling pattern 332a may become smaller and the distribution density of the light-controlling pattern 332a may become greater as the distance from the incident face 331 increases. In alternative embodiments, the size of the light-controlling pattern 332a and the distribution density of the light-controlling pattern 332a may be constant regardless of a position of the light-controlling pattern 332a. In other alternative embodiments, the size and the distribution density of the light-controlling pattern 332a may become greater as the distance from the incident face 331 increases. The light-controlling pattern 332a may have, for example, a substantially arched shape when viewed in a cross-section.

Figure 5:
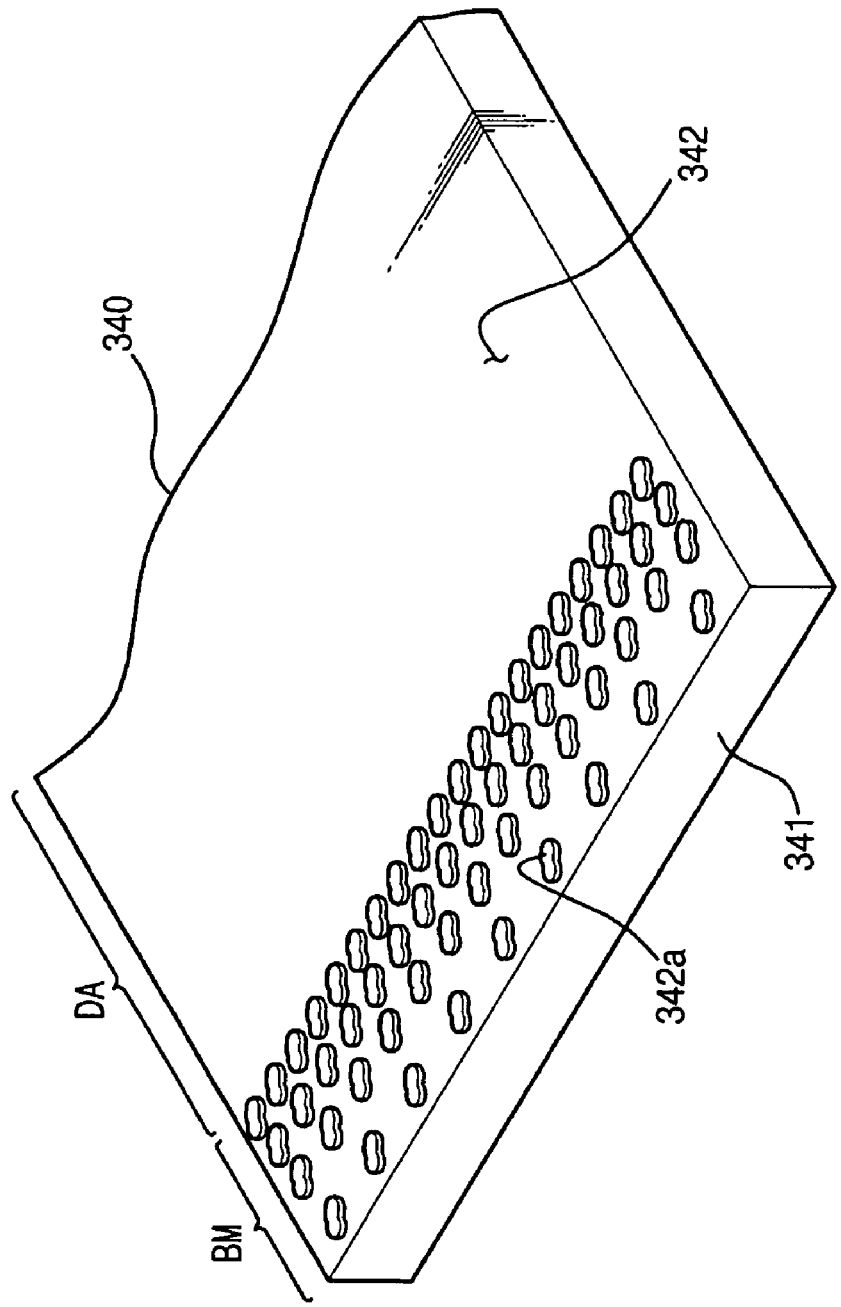
FIG. 5 is a perspective view illustrating a light guide plate in accordance with still another exemplary embodiment of the present invention.

FIG. 5 is a perspective view illustrating a light guide plate in accordance with still another exemplary embodiment.

Referring to FIG. 5, an etched pattern 342a is formed on an exiting face 342 of a light guide plate 340 in an area adjacent to an incident face 341.

In exemplary embodiments, the etched pattern 342a may be formed in an area of the exiting face 342 such that its size and/or distribution densities vary over the distance of the area. The area corresponds to the light blocking area (BM) of a display panel (not shown). In exemplary embodiments, the size of the etched pattern 342a becomes smaller as the distance from the incident face 341 increases, and the distribution density of the etched pattern 342a becomes greater as the distance from the incident face 341 increases.

Figure 6:
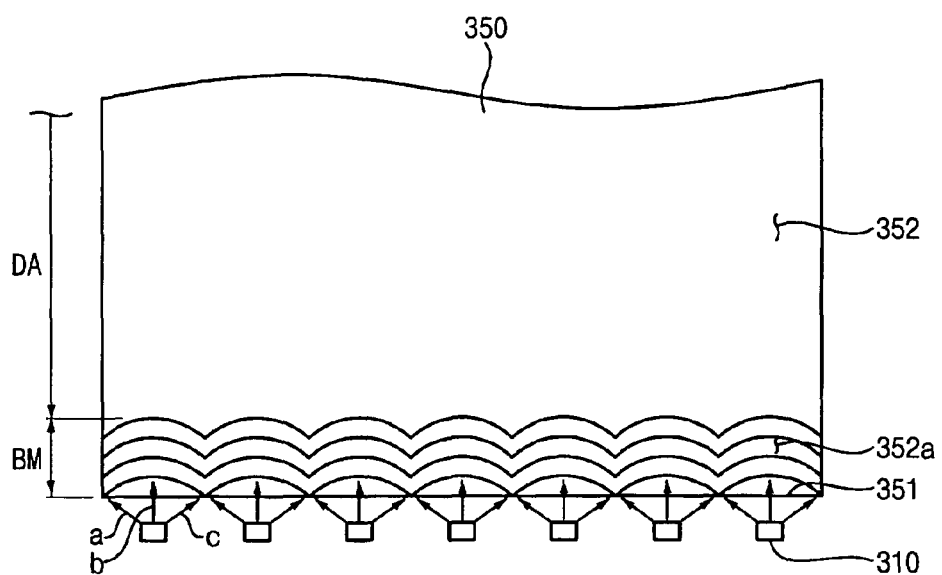
FIG. 6 is a plan view illustrating a light guide plate in accordance with still another exemplary embodiment of the present invention.

FIG. 6 is a plan view illustrating a light guide plate in accordance with still another exemplary embodiment of the present invention.

Referring to FIG. 6, a light-controlling pattern 352a includes a plurality of arched (fan-shaped) patterns arranged one after another when viewed on a plane. The light-controlling pattern 352a is formed on an area of an exiting face 352 of a light guide plate 350 adjacent to an incident face 351 of the light guide plate 350. The area corresponds to a light blocking area (BM) of a display panel (not shown) disposed on the light guide plate 350.

The light-controlling pattern 352a includes a groove pattern with a plurality of recesses, and the recesses are connected to one another in succession. Each of the recesses may have, for example, a substantially fan-shape when viewed on a plane. A plurality of light emitting diodes 310 as a point light source are disposed adjacent to the incident face 351 of the light guide plate 350 such that a center portion of the recesses corresponds to a center portion of light emitting diodes 310. Therefore, lights 'a', 'b' and 'c' emitted from the light emitting diodes 310 may uniformly enter the light guide plate 350 by the fan-shaped, light-controlling pattern 352a.

In exemplary embodiments, the light-controlling pattern 352a may be formed in an area of the exiting face 352 such that its size and/or distribution densities vary over the distance of the area. The area corresponds to the light blocking area (BM) of a display panel (not shown). For example, the distribution density of the light-controlling pattern 352a may become greater as the distance from the incident face 351 increases. In alternative exemplary embodiments, the distribution density of the light-controlling pattern 352a may be constant regardless of a position of the light-controlling pattern 352a. In further alternative exemplary embodiments, the distribution density of the light-controlling pattern 352a may become lower as the distance from the incident face 351 increases. In addition, the arches of the light-controlling pattern 352a may protrude from the exiting face 352 and may be of varying heights. By contrast, the arches of the light-controlling pattern 352a may be recessed at different depths from one another with respect to the exiting face 352. In exemplary embodiments, the light-controlling pattern 352a may have a substantially arched shape or a substantially triangular prism shape when viewed in a cross-section.

Figure 7:
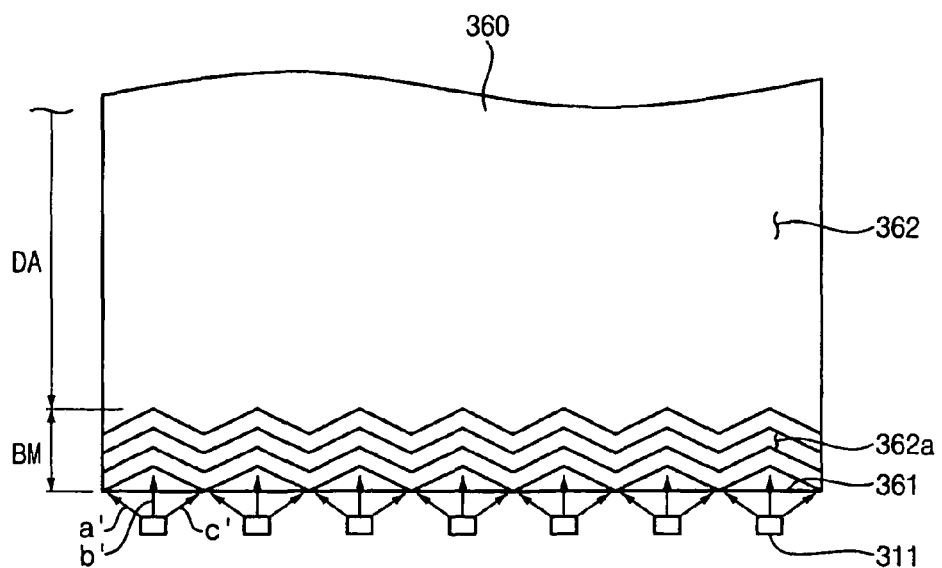
FIG. 7 is a plan view illustrating a light guide plate in accordance with still another exemplary embodiment of the present invention.

FIG. 7 is a plan view illustrating a light guide plate in accordance with still another exemplary embodiment of the present invention.

Referring to FIG. 7, a light-controlling pattern 362a is formed on an exiting face 362 of a light guide plate 360. The light-controlling pattern 362a may have a substantially zigzag-shape when viewed on a plane. The light controlling pattern 362a is formed on an area corresponding to a light blocking area (BM) of a display panel (not shown) disposed on the light guide plate 360.

The light-controlling pattern 362a has groove patterns corresponding to light emitting diodes 311, respectively. Each vertex of the zigzag-shape corresponds to a center portion of the light emitting diode 311 as shown in FIG. 7. Therefore, lights (a', b', c') emitted from the light emitting diode 311 may uniformly enter the light guide plate 360 by the light-controlling pattern 362a having the zigzag-shape.

In exemplary embodiments, the light-controlling pattern 362a may be formed in an area of the exiting face 362 such that its size and/or distribution density vary over the distance of the area. The area corresponds to the light blocking area (BM) of a display panel (not shown). In exemplary embodiments, the size of the light-controlling pattern 362a becomes smaller as the distance from the incident face 361 increases, and the distribution density of the light-controlling pattern 362a becomes greater as the distance from the incident face 361 increases. In alternative exemplary embodiments, the distribution density of the light-controlling pattern 362a may be constant regardless of the position of the light-controlling pattern 362a. In exemplary embodiments, the light-controlling pattern 362a may protrude from the exiting face 362 and may vary in height from one another with respect to the exiting face 362. In alternative embodiments, the light-controlling pattern 362a may be recessed from the exiting face 362 and formed at different depths from one another with respect to the exiting face 362. In exemplary embodiments, the light-controlling pattern 362a may have a substantially arched shape or a triangular prism shape when viewed in a cross-section.

Figure 8:
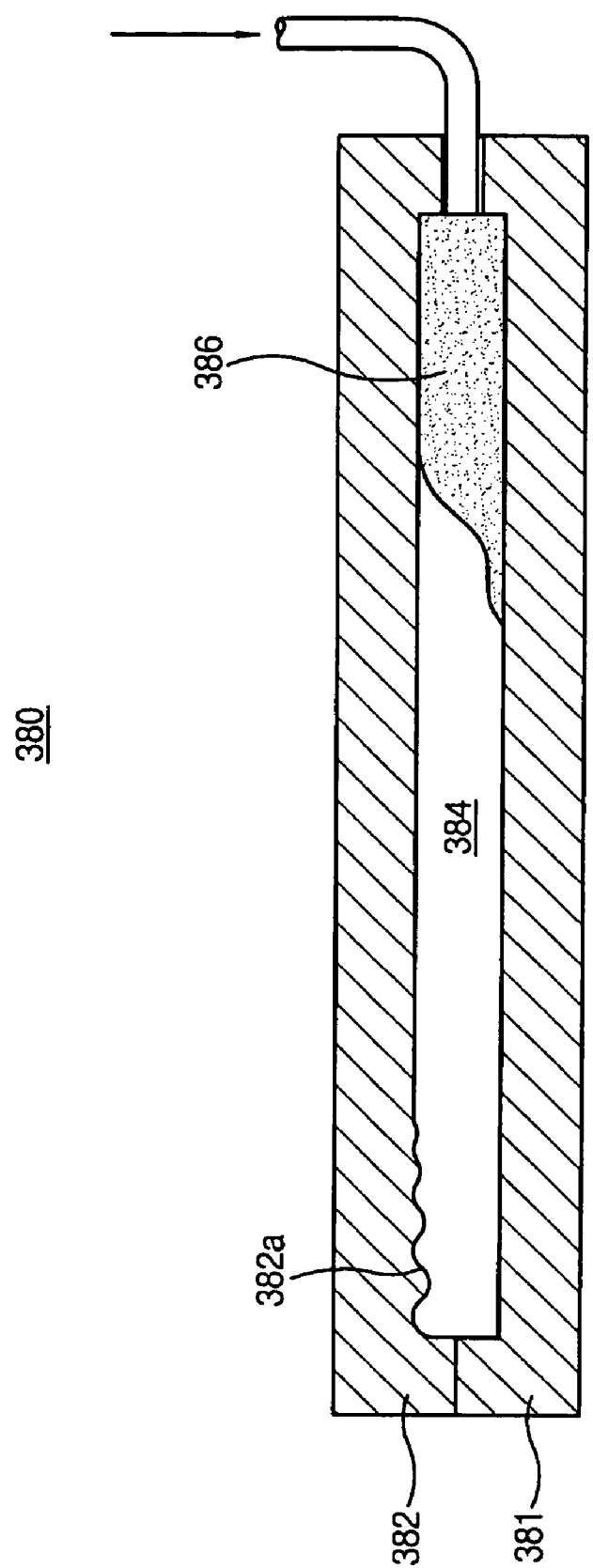
FIG. 8 is a cross-sectional view illustrating a manufacturing apparatus for manufacturing a light guide plate in accordance with an exemplary embodiment of the present invention.

FIG. 8 is a cross-sectional view illustrating a manufacturing apparatus for manufacturing a light guide plate in accordance with an exemplary embodiment.

Referring to FIG. 8, a manufacturing apparatus 380 includes a lower die mold 381 and an upper die mold 382. An etched pattern (not shown) is formed on the lower die mold 381, and a groove pattern 382a is formed on the upper die mold 382. The groove pattern 382a corresponds to a light blocking area (BM) of a display panel, and the light blocking area (BM) is adjacent to a light emitting diode (LED).

The manufacturing apparatus 380 has a cavity 384 that is filled with, for example, a synthetic resin 386 to form a body of the light guide plate. The groove pattern 382a may be, for example, various patterns such as a dot pattern, an etched pattern, etc., as described in FIGS. 3 to 5.

Figure 9:
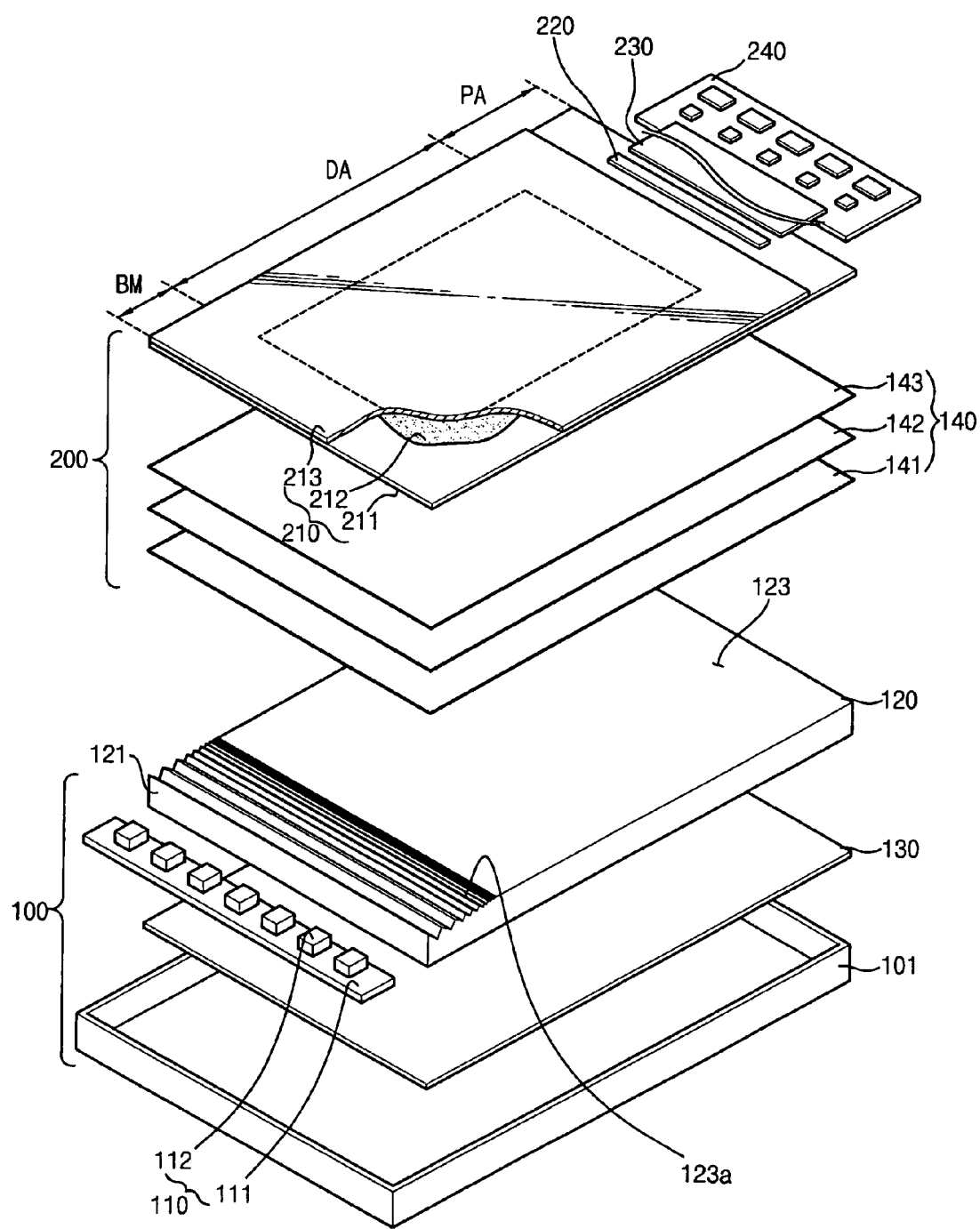
FIG. 9 is an exploded perspective view illustrating a display apparatus in accordance with an exemplary embodiment of the present invention.

FIG. 9 is an exploded perspective view illustrating a display apparatus in accordance with an exemplary embodiment.

Referring to FIG. 9, the display apparatus includes a back light assembly 100 and a display assembly 200.

The back light assembly 100 includes a receiving container 101, a light generating part 110, a light guide plate 120, a reflecting member 130 and an optical member 140.

The receiving container 101 receives the light generating part 110, the light guide plate 120, the reflecting member 130 and the optical member 140.

The light generating part 110 includes a plurality of light emitting diodes 112 and a printed circuit board 111 on which the light emitting diodes 112 are mounted.

The light guide plate 120 includes a light-controlling pattern 123a formed on an exiting face 123 of the light guide plate 120. The light-controlling pattern 123a is formed in a first area that is adjacent to an incident face 121 of the light guide plate 120. The first area corresponds to a light blocking area (BM) of a display panel 210.

The light-controlling pattern 123a may comprise, for example, a groove pattern, a dot-pattern, an etched pattern, etc. The light-controlling pattern 123a guides an incident light to a display area (DA) of the display panel 210.

The reflecting member 130 is disposed under the light guide plate 120, and reflects light that may have leaked out from the light guide plate 120 back toward the light guide plate 120.

The optical member 140 is disposed on the light guide plate 120, and uniformizes a brightness of the light exiting from the light guide plate 120. The optical member 140 includes a diffusion sheet 141, a first prism sheet 142 and a second prism sheet 143.

The display assembly 200 includes the display panel 210, a driving chip 220, a flexible circuit board 230 and a printed circuit board 240.

The display panel 210 includes an array substrate 211, a color filter substrate 212 and a liquid crystal layer 213. The display panel 210 receives the light from the back light assembly 100 to display an image using electric and optical properties of the liquid crystal layer 213.

The array substrate 211 includes a display area (DA) in which pixels defined by gate lines and data lines are formed and a peripheral area (PA) formed around the display area (DA). The color filter substrate 212 includes a display area (DA) in which color filters corresponding to the pixels are formed as well as a light blocking area (BM) to block the light.

The driving chip 220 is mounted in the peripheral area (PA), and the driving chip 220 is integrated into one-chip. The driving chip 220 applies a driving signal to the data lines and the gate lines in the display area (DA) based on a data signal and a control signal applied from the flexible printed circuit board 230.

The flexible printed circuit board 230 electrically connects the driving chip 220 to the printed circuit board 240, and transmits the data and control signals applied from the printed circuit board 240 to the driving chip 220.

Figure 10:
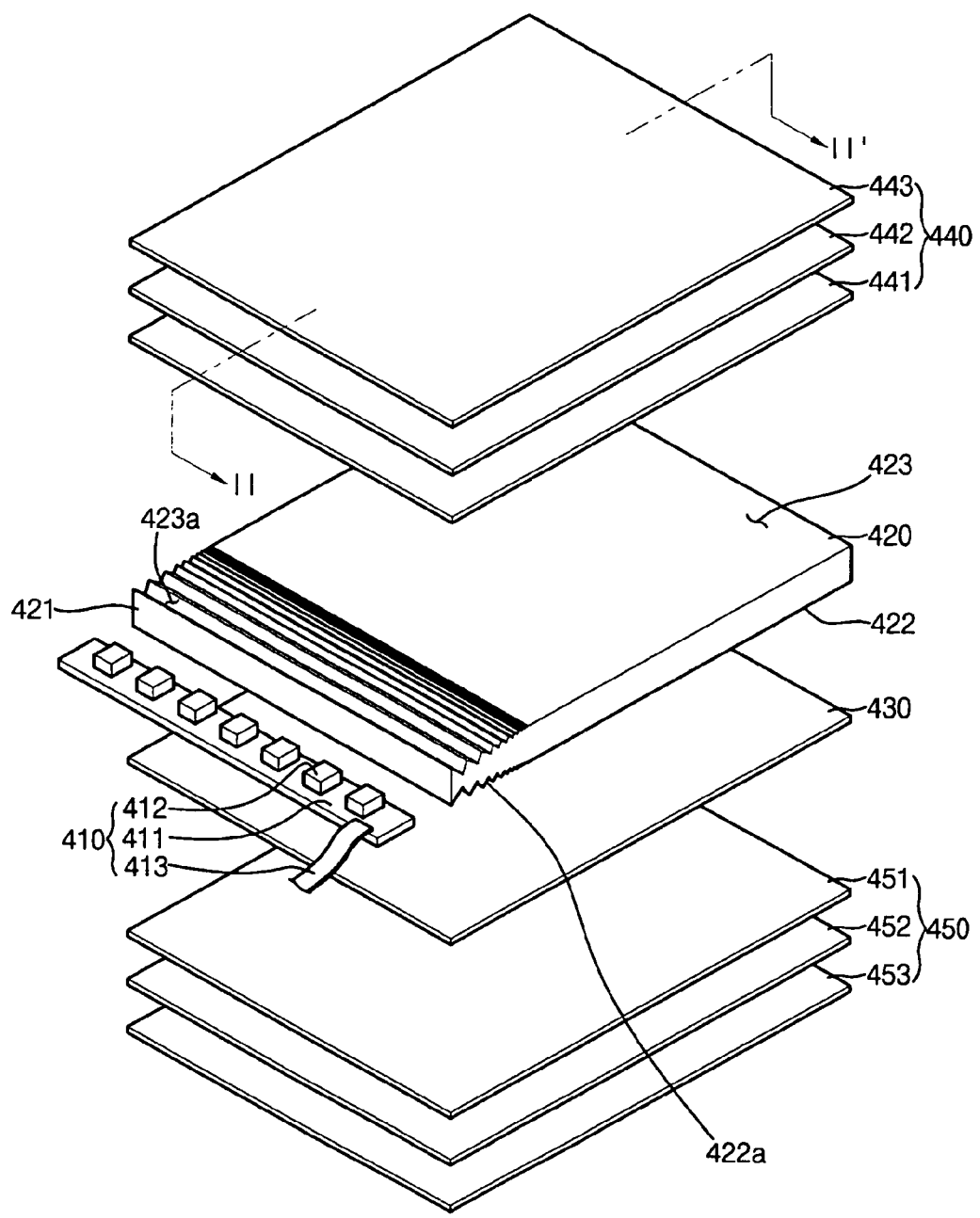
FIG. 10 is an exploded perspective view illustrating a back light assembly in accordance with another exemplary embodiment of the present invention.

FIG. 10 is an exploded perspective view illustrating a back light assembly in accordance with an exemplary embodiment of the present invention.

Referring to FIG. 10, the back light assembly includes a light generating part 410, a light guide plate 420, a transflective member 430, a first optical member 440 and a second optical member 450.

The light generating part 410 includes a printed circuit board 411, a light source 412 having a plurality of light emitting diodes and a flexible printed circuit board 413. The light emitting diodes of the light source 412 are mounted on the printed circuit board 411. The flexible printed circuit board 413 connects a power supply (not shown) to the light emitting diodes 412 mounted on the printed circuit board 411, and the flexible printed circuit board 413 applies a driving voltage to the light emitting diodes 412. In alternative embodiments, the light source 412 may include a linear lamp.

The light guide plate 420 is disposed between the first and second optical members 440 and 450, respectively. The light guide plate 420 includes a first face 422 on which a printed pattern and an etched pattern are formed to guide an incident light emitted from the light emitting diodes 412 toward a second face 423 of the light guide plate 420. A first light-controlling pattern 422a is formed in a first area of the first face 422 adjacent to an incident face 421 of the light guide plate 420. The first area corresponds to a second light blocking area (BM) of a second display panel disposed under the first face 422 of the light guide plate 420.

A second light-controlling pattern 423a is formed on the second face 423. The second light-controlling pattern 423a is formed in a second area adjacent to the incident face 421. The second area corresponds to a first light blocking area (BM) of a first display panel (not shown) disposed on the second face 423 of the light guide plate 420. The first and second light-controlling patterns 422a and 423a may include, e.g., various patterns such as a groove pattern, a dot pattern, an etched pattern, etc. The first and second light-controlling patterns 422a and 423a guide an incident light to the first and second areas of the first and second display panels, respectively.

The transflective member 430 is disposed under the first face 422 of the light guide plate 420 so as to reflect light exiting from light guide plate 420 back to the second face 423 or to transmit the light to the first face 422. The transflective member 430 may have a substantially plate-shape or a substantially sheet-shape.

The first optical member 440 is disposed on the second face 423 of the light guide plate 420 to enhance brightness of the light exiting from the second face 423 of the light guide plate 420. The first optical member 440 may include a diffusion sheet 441, a first prism sheet 442 and a second prism sheet 443, etc.

The second optical member 450 is disposed under the first face 422 to enhance brightness of the light exiting from the first face 422. That is, the second optical member 450 improves the brightness of the light transmitted through the transflective member 430. The second optical member 450 may include a diffusion sheet 451, a first prism sheet 452 and a second prism sheet 453.

Figure 11:
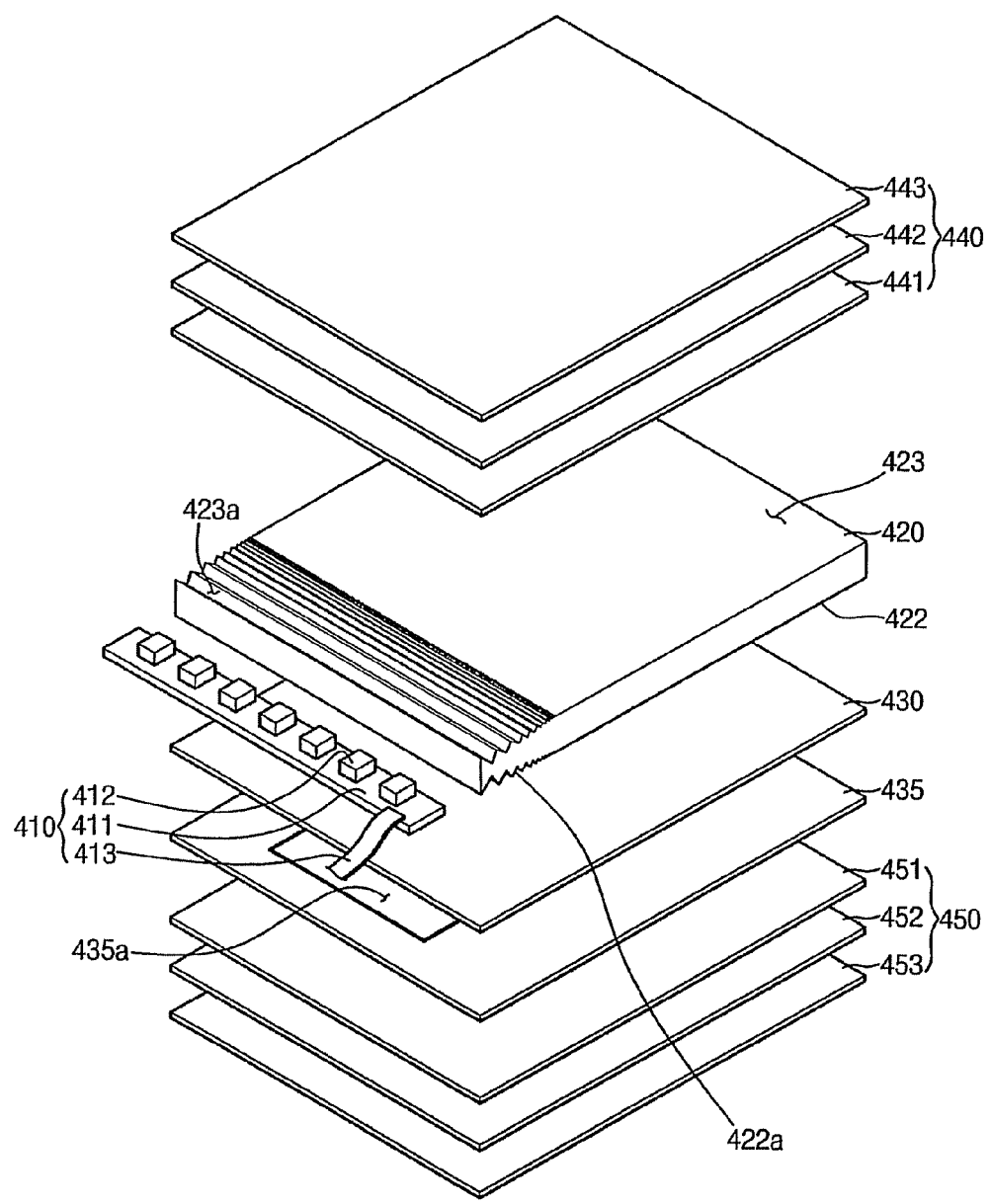
FIG. 11 is an exploded perspective view illustrating a back light assembly in accordance with still another exemplary embodiment of the present invention.

FIG. 11 is an exploded perspective view illustrating a back light assembly in accordance with another exemplary embodiment of the present invention.

Referring to FIG. 11, the back light assembly includes a light generating part 410, a light guide plate 420, a transflective member 430, a reflecting member 435, a first optical member 440 and a second optical member 450. In FIG. 11, the same reference numerals are used to refer to the same or like parts as those in FIG. 10, and any further repetitive descriptions will be omitted.

The reflecting member 435 has an opening 435a. The opening 435a is substantially the same size as that of a second display panel (not shown) disposed under the second optical member 450. The reflecting member 435 reflects light transmitted through the transflective member 430 back to the transflective member 430. That is, the reflecting member 435 reflects the light transmitted through the transflective member 430 toward the light guide plate 420. The light transmitted through the transflective member 430 is partially provided to the second display panel through the opening 435a.

The light transmitted through the transflective member 430, except for the light provided to the second display panel, is reflected to the light guide plate 420 again to improve the efficiency of a light.

Figure 12:
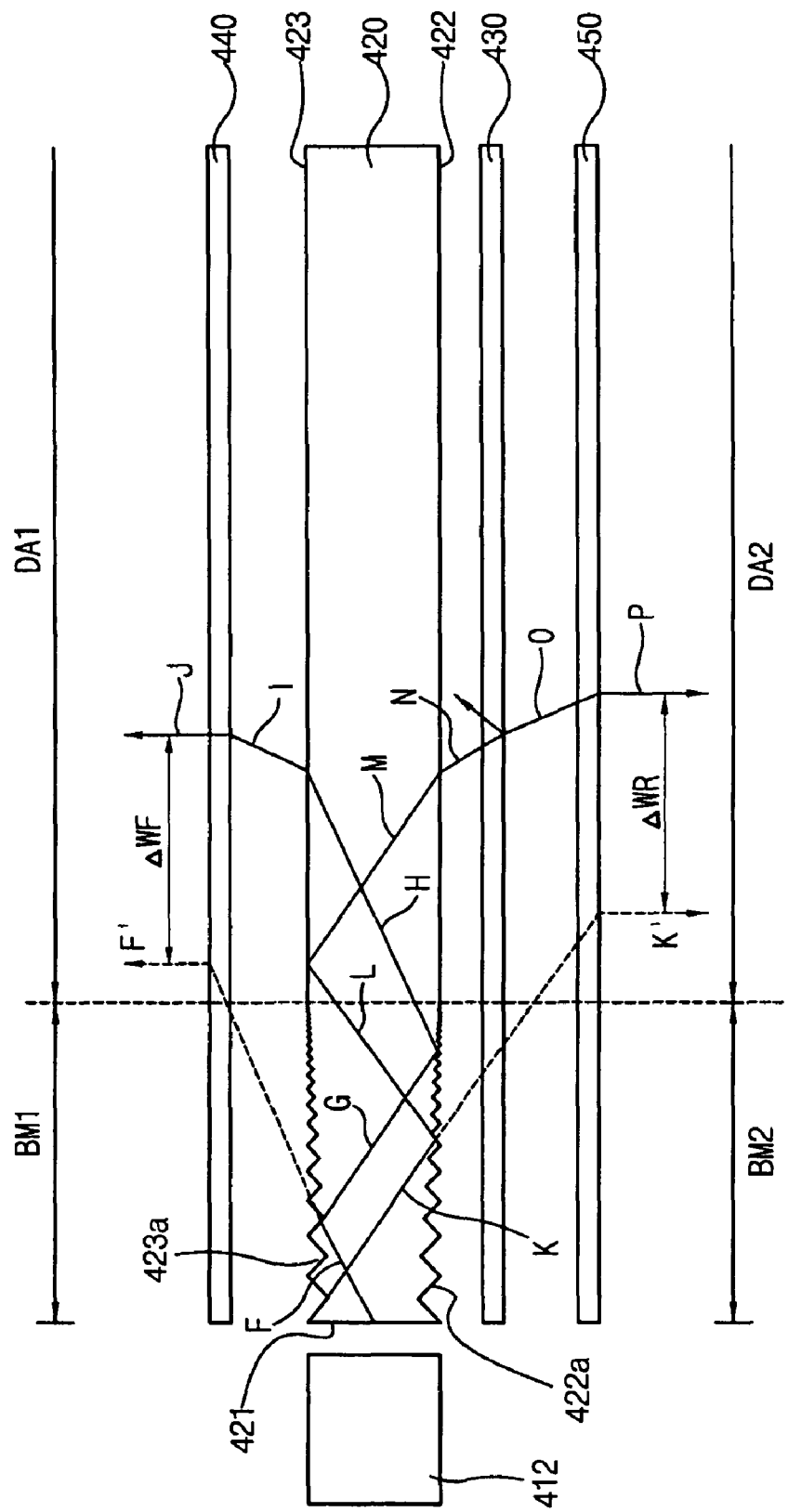
FIG. 12 is a cross-sectional view cut along line II-II' in FIG. 10.

FIG. 12 is a cross-sectional view taken along line II-II' in FIG. 10.

Referring to FIGS. 10 and 12, the light exiting from the light emitting diode 412 is incident into the incident face 421 of the light guide plate 420. The light guide plate 420 guides the incident light to the first and second faces 422 and 423.

The printed pattern and the etched pattern are formed on the first face 422, and the first light-controlling pattern 422a is formed in the first area adjacent to the incident face 421. The first area corresponds to the first light blocking area (BM1) of the second display panel disposed under the first face 422. The second light-controlling pattern 423a is formed on the second face 423 of the light guide plate 420 and formed in the second area adjacent to the incident face 421. The second area corresponds to the second light blocking area (BM2) of the first display panel disposed on the second face 423.

The first and second light-controlling patterns 422a and 423a may include, e.g., various patterns such as a groove pattern, a dot-pattern and an etched pattern, etc. Also, the first and second light-controlling patterns 422a and 423a may have various sizes and distribution densities. In an exemplary embodiment, the sizes of the first and second light-controlling patterns 422a and 423a may become smaller as the distance from the incident face 421 increases, whereas the distribution densities of the first and second light-controlling patterns 422a and 423a may become greater as the distance from the incident face 421 increases.

A portion of the light exiting from the first face 422 is reflected by the transflective member 430 to enter the light guide plate 420, and a remaining portion of the light exiting from the first face 422 enters the second optical member 450 through the transflective member 430. The second optical member 450 improves a brightness of the remaining light transmitted through the transflective member 430. That is, the brightness of the light exiting from the second face 423 is improved by the first optical member 440.

Hereinafter, a process of controlling a light emitted from the light emitting diodes 412 by the first and second light-controlling patterns 422a and 423a now will be described.

Among the light from the light emitting diodes 412, a first light 'F' directly applied to the second face 423 of the light guide plate 420 through the incident face 421 is changed into a second light 'G' by the second light-controlling pattern 423a. The second light 'G' is changed into a third light 'H' by the first light-controlling pattern 422a, and the third light 'H' advances toward the second face 423. A fourth light 'I' exiting from the second face 423 is condensed by the first optical member 440 and changed into a fifth light 'J' exiting from the first optical member 440.

Accordingly, the first light 'F' directly applied to the second face 423 of the light guide plate 420 is guided by the second light-controlling pattern 423a to be changed into the fifth light 'J'. Had the second light-controlling pattern 423a not been formed on the light guide plate 420, the first light 'F' directly applied to the second face 423 would instead be changed into a sixth light 'F'', causing a bright light to occur.

Therefore, the first light 'F' is shifted to a display area by a distance ΔWF by the second light-controlling pattern 423a formed on the second face 423, and the first light 'F' exits from the light guide plate 420.

A seventh light 'K' directly applied to the first face 422 of the light guide plate 420 through the incident face 421 is changed into an eighth light 'L' by the first light-controlling pattern 422a. A portion of the eighth light 'L' exits through the second face 423, and a remaining portion of the eighth light 'L' is reflected from the second face 423 as a ninth light 'M'. The ninth light 'M' is guided by the light guide plate 420 and changed into a tenth light 'N'. The tenth light 'N' exits through the first face 422. A portion of the tenth light 'N' is reflected by the transflective member 430, and a remaining portion of the tenth light 'N' transmits through the transflective member 430 as a eleventh light 'O'. The eleventh light 'O' is condensed by the second optical member 450 and changed into a twelfth light 'P', so that the twelfth light 'P' having a uniform brightness exits from the second optical member 450.

The seventh light 'K' directly applied to the first face 422 of the light guide plate 420 is guided by the first light-controlling pattern 422a to be changed into the twelfth light 'P'. Had the first light-controlling pattern 422a not been formed on the light guide plate 420, the seventh light 'K' directly applied to the first face 422 would instead be changed into a thirteenth light 'K'', causing a bright light to occur.

Therefore, the seventh light 'K' is shifted to a second display area (DA2) by a distance ΔWR by the first light-controlling pattern 422a and exits from the first face 422 of the light guide plate 420 as the twelfth light 'P'.

Hereinafter, various light-controlling patterns formed on the light guide plate will be described.

Figure 13:
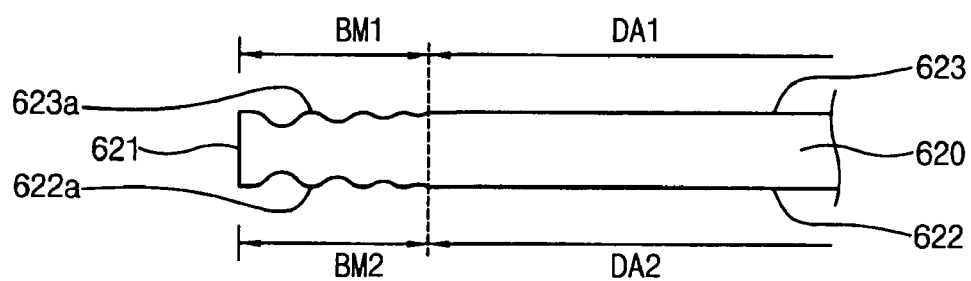
FIG. 13 is a cross-sectional view illustrating a light guide plate in accordance with still another exemplary embodiment of the present invention.

FIG. 13 is a cross-sectional view illustrating a light guide plate in accordance with an exemplary embodiment of the present invention.

Referring to FIG. 13, a light guide plate 620 includes a first face 622 and a second face 623. A printed pattern and an etched pattern are formed on the first face 622. The first light-controlling pattern 622a having a groove shape is formed on the first face 622. The first light-controlling pattern 622a is formed in a first area of the first face 622 adjacent to an incident face 621 of the light guide plate 620. The first area corresponds to a second light blocking area (BM2) of a second display panel (not shown) disposed under the light guide plate 620.

The second light-controlling pattern 623a having the groove shape is formed on the second face 623 of the light guide plate 620. The second light-controlling pattern 623a is formed in a second area of the second face 633 adjacent to the incident face 621 of the light guide plate 620. The second area corresponds to a first light blocking area (BM1) of a first display panel (not shown) disposed on the light guide plate 620.

The first and second light-controlling patterns 622a and 623a have substantially corrugated shapes when viewed in cross-section. The first and second light-controlling patterns 622a and 623a may have variable sizes and distribution densities as the first and second light-controlling patterns 622a and 623a are spaced further apart from the incident face 621. The sizes of the first and second light-controlling patterns 622a and 623a become smaller as the first and second light-controlling patterns 622a and 623a are spaced further apart from the incident face 621, whereas the distribution densities of the first and second light-controlling patterns 622a and 623a become greater as the first and second light-controlling patterns 622a and 623a are spaced further apart from the incident face 621.

In alternative embodiments, the sizes and the distribution densities of the first and second light-controlling patterns 622a and 623a may be constant regardless of the positions of the first and second light-controlling patterns 622a and 623a. In alternative embodiments, the sizes of the first and second light-controlling patterns 622a and 623a may become greater as the first and second light-controlling patterns 622a and 623a are spaced further apart from the incident face 621. Also, the distribution densities of the first and second light-controlling patterns 622a and 623a may become greater as the first and second light-controlling patterns 622a and 623a are spaced further apart from the incident face 621. The first and second light-controlling patterns 622a and 623a may have a substantially triangular prism shape when viewed in a cross-section.

Figure 14:
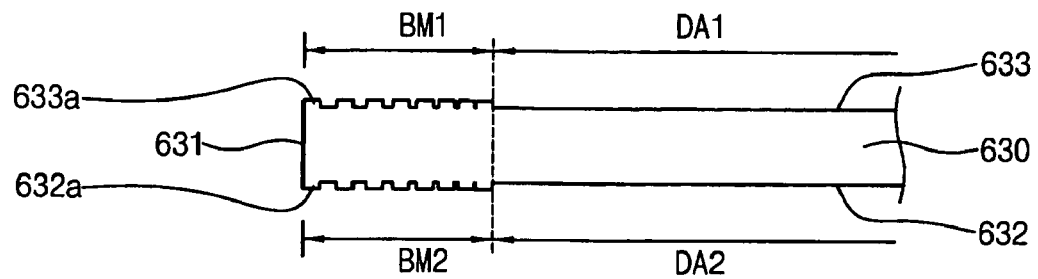
FIG. 14 is a cross-sectional view illustrating a light guide plate in accordance with still another exemplary embodiment of the present invention.

FIG. 14 is a cross-sectional view illustrating a light guide plate in accordance with another exemplary embodiment of the present invention.

Referring to FIG. 14, a light guide plate 630 includes a first face 632 and a second face 633. A printed pattern and an etched pattern are entirely formed on the first face 632 of the light guide plate 630, and also a first light-controlling pattern 632a is formed on the first face 632 of the light guide plate 630. The first light-controlling pattern 632a has a substantially dot shape when viewed on a plane. The first light-controlling pattern 632a is formed in a first area of the first face 632 that is adjacent to an incident face 631 of the light guide plate 630. The first area corresponds to a second light blocking area (BM2) of a second display panel (not shown) disposed under the light guide plate 630.

A second light-controlling pattern 633a is formed on the second face 633. The second light-controlling pattern 633a has a substantially dot-shape when viewed on a plane. The second light-controlling pattern 633a is formed in a second area of the second face 633 adjacent to the incident face 631 of the light guide plate 630. The second area corresponds to a first light blocking area (BM1) of a first display panel (not shown) disposed on the light guide plate 630.

The first and second light-controlling patterns 632a and 633a may have various sizes and distribution densities. The size of the first and second light-controlling patterns 632a and 633a become smaller as the first and second light-controlling patterns 632a and 633a are spaced further apart from the incident face 631, whereas the distribution densities of the first and second light-controlling patterns 632a and 633a become greater as the first and second light-controlling patterns 632a and 633a are spaced further apart from the incident face 631 of the light guide plate 630. Alternatively, the sizes and the distribution densities of the first and second light-controlling patterns 632a and 633a may be constant regardless of the positions of the first and second light-controlling patterns 632a and 633a. Alternatively, the sizes and distribution densities of the first and second light-controlling patterns 632a and 633a may become greater as the first and second light-controlling patterns 632a and 633a are spaced further apart from the incident face 631. The first and second light-controlling patterns 632a and 633a may have a substantially arched shape when viewed in a cross-section.

Figure 15:
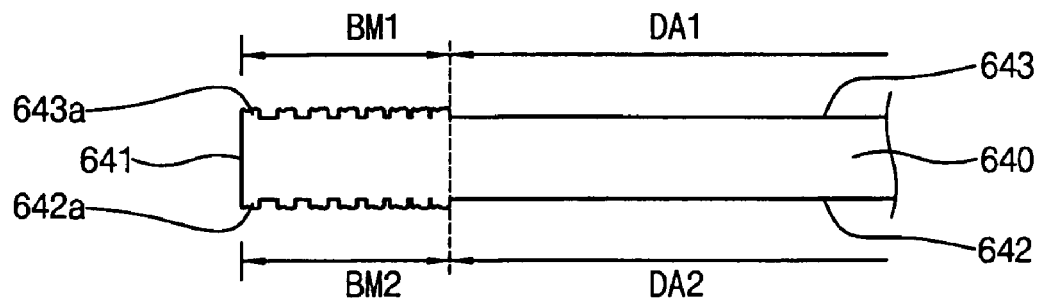
FIG. 15 is a cross-sectional view illustrating a light guide plate in accordance with still another exemplary embodiment of the present invention.

FIG. 15 is a cross-sectional view illustrating a light guide plate in accordance with another exemplary embodiment of the present invention.

Referring to FIG. 15, a light guide plate 640 includes a first face 642 and a second face 643. A printed pattern and an etched pattern are formed on the first face 642. The first light-controlling pattern 642a is also formed on the first face 642 of the light guide plate 640. The first light-controlling pattern 642 has a substantially dot-shape when viewed on a plane. The first light-controlling pattern 642a is formed in a first area of the first face 642 adjacent to an incident face 641 of the light guide plate 640. The first area corresponds to a second light blocking area (BM2) of a second display panel (not shown) disposed under the light guide plate 640.

A second light-controlling pattern 643a is formed on the second face 643, and has a substantially dot-shape when viewed on a plane. The second light-controlling pattern 643a is formed in a second area of the second face 643 adjacent to an incident face 641 of the light guide plate 640. The second area corresponds to a first light blocking area (BM1) of a first display panel (not shown) disposed on the light guide plate 640.

The first and second light-controlling patterns 642a and 643a may have various sizes and distribution densities. In exemplary embodiments, the sizes of the first and second light-controlling patterns 642a and 643a become smaller as the first and second light-controlling patterns 642a and 643a are spaced further apart from the incident face 641, and the distribution densities of the first and second light-controlling patterns 642a and 643a become greater as the first and second light-controlling patterns 642a and 643a are spaced further apart from the incident face 641 of the light guide plate 640.

Although not shown in Figures, the first and second light-controlling patterns 422a and 423a in FIG. 10 may be formed on the first and second exiting faces, respectively, such that the first and second light-controlling patterns have a substantially same shape as those of the first and second light controlling patterns 352a and 362a shown in FIGS. 6 and 7.

Figure 16:
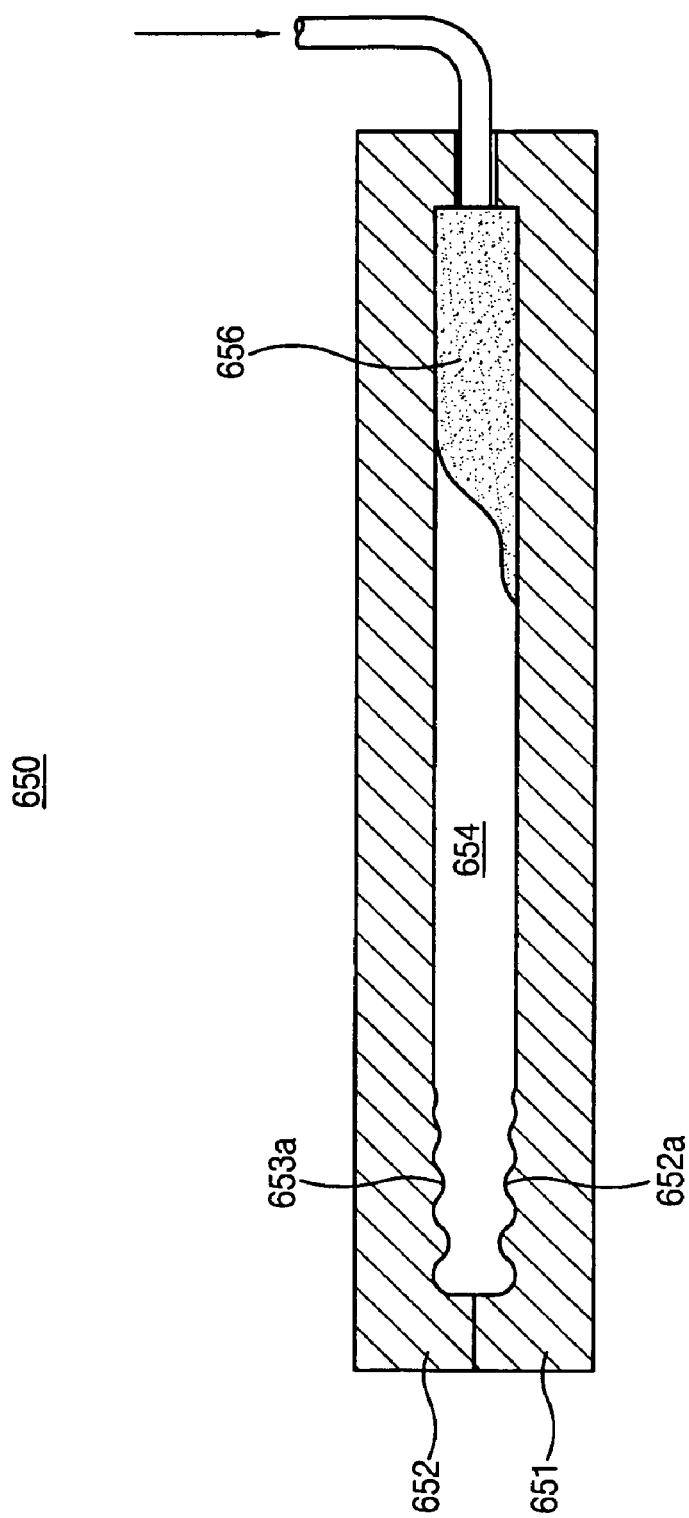
FIG. 16 is a cross-sectional view illustrating a manufacturing apparatus for manufacturing a light guide plate in accordance with another exemplary embodiment of the present invention.

FIG. 16 is a cross-sectional view illustrating a manufacturing apparatus for manufacturing a light guide plate in accordance with another embodiment of the present invention.

Referring to FIG. 16, a manufacturing apparatus 650 includes a lower die mold 651 and an upper die mold 652. A first groove pattern 652a is formed on the lower die mold 651, and a second groove pattern 653a is formed on the upper die mold 652. The first and second groove patterns 652a and 653a correspond to first and second light blocking areas (BM1) and (BM2) that are adjacent to a light emitting diode, respectively. The first and second light blocking areas (BM1) and (BM2) are formed on first and second display panels, respectively.

The manufacturing apparatus 650 has a cavity 654 in the manufacturing apparatus 650. The cavity 654 may be filled with, e.g., a synthetic resin 656 to form a body of the light guide plate. The first and second groove patterns 652a and 653a may have various shapes as shown in FIGS. 10 to 12. In addition, the first and second groove patterns 652a and 653a may have a different shape.

Figure 17:
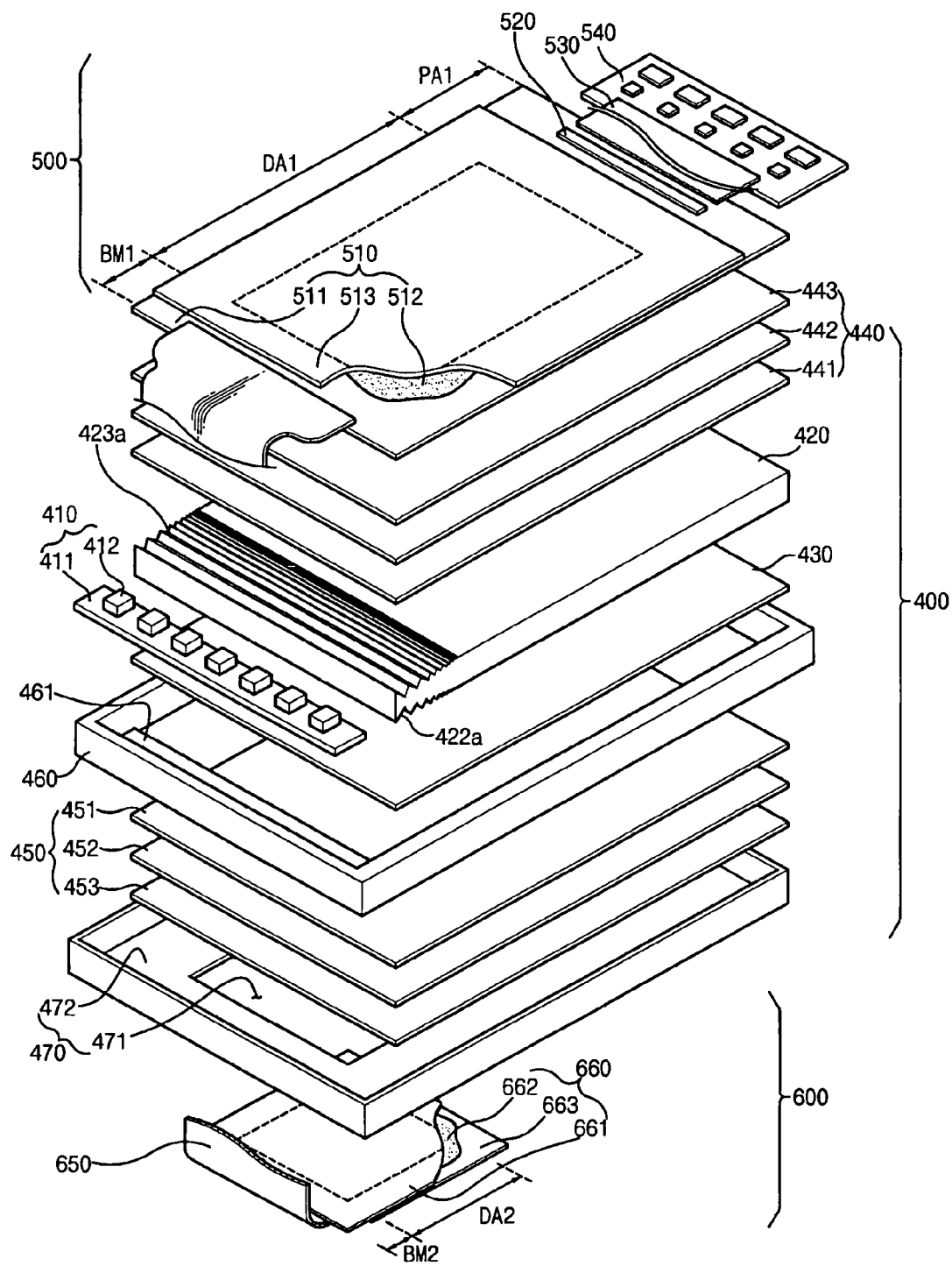
FIG. 17 is an exploded perspective view illustrating a display apparatus in accordance with an exemplary embodiment.

FIG. 17 is an exploded perspective view illustrating a display apparatus in accordance with an exemplary embodiment of the present invention. In FIG. 17, the display apparatus includes the back light assembly shown in FIG. 8.

Referring to FIG. 17, the display apparatus includes a back light assembly 400, a first display assembly 500 and a second display assembly 600.

The back light assembly 400 includes a light generating part 410, a light guide plate 420, a transflective member 430, a first optical member 440, a second optical member 450, a first receiving container 460 and a second receiving container 470.

The light generating part 410 includes a plurality of light emitting diodes 412 and a printed circuit board 411 on which the light emitting diodes 412 are mounted.

The light guide plate 420 includes a first face 422 and a second face 423. Patterns such as a printed pattern and an etched pattern, etc., are formed on the first face 422 of the light guide plate 420. The first light-controlling pattern 422a is also formed on the first face 422 of the light guide plate 420. The first light-controlling pattern 422a is formed in a first area of the first face 422 that is adjacent to an incident face of the light guide plate 430. The first area corresponds to a second light blocking area (BM2) of a second display panel 660 disposed under the light guide plate 420.

A second light-controlling pattern 423a having a substantially groove shape is formed on the second face 423. The second light-controlling pattern 423a is formed in a second area of the second face 423 that is adjacent to the incident face of the light guide plate 420. The second area corresponds to a first light blocking area (BM1) of a first display panel 510 disposed on the light guide plate 420.

The first and second light-controlling patterns 422a and 423a include, e.g., a groove pattern, a dot pattern, an etched pattern, etc. The first and second light-controlling patterns 422a and 423a guide an incident light to the first and second display assemblies 500 and 600, respectively.

The transflective member 430 is disposed under the light guide plate 420 to reflect or transmit light leaked from the light guide plate 420. The reflected light from the transflective member 430 is guided to the light guide plate 420, and the transmitted light through the transflective member 430 is guided to the second optical member 450.

The first optical member 440 is disposed on the light guide plate 420 to improve a brightness of a first light guided by the light guide plate 420. In the embodiment shown in FIG. 17, an example of the first optical member 440 may include a diffusion sheet 441, a first prism sheet 442 and a second prism sheet 443, etc.

The second optical member 450 is disposed under the light guide plate 420 to improve a brightness of a second light guided by the light guide plate 420. In the embodiment shown in FIG. 17, an example of the second optical member 450 may include a diffusion sheet 451, a first prism sheet 452 and a second prism sheet 453, etc.

The first receiving container 460 includes a first bottom surface 461 and a first sidewall (not shown) extended from the first bottom surface 461 to provide a first receiving space. The first receiving container 460 receives the light generating part 410, the light guide plate 420, the transflective member 430, the first optical member 440 and the first display assembly 500. In addition, the first receiving container 460 guides the second optical member 450.

The second receiving container 470 includes a second bottom surface 472 and a second sidewall (not shown) extended from the second bottom surface 472 to provide a second receiving space. The second bottom surface 472 has an opening 471 corresponding to a position and a size of the second display assembly 600. A light exiting from the back light assembly 400 through the opening 471 is provided to the second display assembly 600 disposed on the second bottom surface 472.

The second receiving container 470 receives the first receiving container 460 and the second optical member 450.

The first display assembly 500 includes a first display panel 510, a driving chip 520, a first flexible circuit board 530 and a printed circuit board 540.

The display panel 510 includes an array substrate 511, a color filter substrate 512 and a liquid crystal layer 513. The display panel 510 receives the first light exiting from the back light assembly 400 to display an image using electric and optical properties of the liquid crystal layer 513.

The first array substrate 511 includes a first display area (DA1) in which pixels defined by gate lines and data lines are formed, and a first peripheral area (PA1) formed around the first display area (DA1). The first color filter substrate 512 includes a first display area (DA1) in which color filters corresponding to the pixels are formed, and a first light blocking area (BM1).

The driving chip 520 is mounted on the first peripheral area (PA1), and the driving chip 520 is integrated into one-chip. The driving chip 520 receives a data signal and a control signal applied from the first flexible printed circuit board 530, and the driving chip 520 applies a driving signal to the data and gate lines formed in the first display area (DA1).

The first flexible printed circuit board 530 electrically connects the driving chip 520 to the printed circuit board 540, and transmits the data and control signals applied from the printed circuit board 540 to the driving chip 520.

The second display assembly 600 includes a second flexible printed circuit board 650 and a second display panel 660. The second flexible printed circuit board 650 electrically connects the first display panel 510 to the second display panel 660. The second flexible printed circuit board 650 transmits a driving signal to the second display panel 660 from the first display panel 510.

The second display panel 660 includes a second array substrate 661, a second color filter substrate 662 and a liquid crystal layer 663. The display panel 660 receives a second light exiting from the back light assembly 400 to display an image using electrical and optical properties of the liquid crystal layer 663.

The second array substrate 661 includes a second display area (DA2) in which pixels defined by gate lines and data lines are formed. The second color filter substrate 662 includes the second display area (DA2) in which color filters corresponding to the pixels, and a second light blocking area (BM2).

According to the above, the light-controlling pattern is formed on a portion of the exiting face of the light guide plate, and the portion of the exiting face of the light guide plate is formed adjacent to the light source, so that the light guide plate prevents the light incident into the light guide plate from directly exiting from the light guide plate. Therefore, the light guide plate prevents a bright line or a dark area from being generated at the display panel adjacent to the light source.

Having thus described exemplary embodiments of the present invention, it is to be understood that the invention defined by the appended claims is not to be limited by particular details set forth in the above description as many apparent variations thereof are possible without departing from the spirit or scope thereof as hereinafter claimed.

What is claimed is:

1. A light guide plate comprising:
   an incident face receiving an incident light provided from an exterior;
   a first exiting face including:
      a first area and a second area, the second area being adjacent to the incident face, and being disposed between the incident face and the first area, and
      a first light-controlling pattern disposed in the second area to guide the incident light to the first area, the guided light by the first light-controlling pattern exiting from the first exiting face; and
   a second exiting face including:
      a third area and a fourth area, the fourth area being adjacent to the incident face, and overlapped with the second area of the first exiting face in a plan view, and
      a second light-controlling pattern disposed in the fourth area and not disposed in the third area, the second light-controlling pattern guiding the incident light to the third area, the guided light exiting from the second exiting face.

2. The light guide plate of claim 1, wherein the second exiting face comprises a third light-controlling pattern disposed in the third area of the second exiting face.

3. The light guide plate of claim 1, wherein a distribution density of the first light-controlling pattern becomes greater as the distance from the incident face increases.

4. The light guide plate of claim 1, wherein a size of the first light-controlling pattern becomes smaller as the distance from the incident face increases.

5. The light guide plate of claim 1, wherein the first light-controlling pattern comprises a recess having a groove shape, and the recess is extended in a direction substantially in parallel with a surface of the incident face.

6. The light guide plate of claim 1, wherein the first light-controlling pattern has a substantially dot shape when viewed on a plane.

7. The light guide plate of claim 1, wherein the first light-controlling pattern comprises a plurality of protruded patterns having a different height with respect to a surface of the first exiting face.

8. The light guide plate of claim 1, wherein the first light-controlling pattern comprises a plurality of recessed patterns having a different depth with respect to the first exiting face.

9. The light guide plate of claim 1, wherein the first light-controlling pattern has a plurality of arched patterns arranged in succession when viewed on a plane.

10. The light guide plate of claim 1, wherein the second light-controlling pattern has a substantially zigzag shape when viewed on a plane.

11. The light guide plate of claim 1, wherein a distribution density of the second light-controlling pattern becomes greater as a distance from the incident face increases.

12. The light guide plate of claim 1, wherein a size of the second light-controlling pattern becomes smaller as a distance from the incident face increases.

13. The light guide plate of claim 1, wherein the second light-controlling pattern comprises a recess having a groove shape, and the recess is extended in a direction substantially in parallel with the incident face.

14. The light guide plate of claim 1, wherein the second light-controlling pattern has a substantially dot shape.

15. The light guide plate of claim 1, wherein the second light-controlling pattern comprises a plurality of protruded patterns having a different height with respect to the second exiting face.

16. The light guide plate of claim 1, wherein the second light-controlling pattern comprises a plurality of recessed patterns having a different depth with respect to the second exiting face.

17. The light guide plate of claim 1, wherein the second light-controlling pattern has a plurality of arches arranged in succession when viewed on a plane.

18. The light guide plate of claim 1, wherein the second light-controlling pattern has a substantially zigzag shape when viewed on a plane.

19. A back light assembly comprising:
   a light source to generate a light; and
   a light guide plate comprising:
      an incident face receiving an incident light provided from an exterior;
      a first exiting face including:
         a first area and a second area, the second area being adjacent to the incident face, and being disposed between the incident face and the first area, and
         a first light-controlling pattern disposed in the second area to guide the incident light to the first area, the guided light by the first light-controlling pattern exiting from the first exiting face; and a second exiting face including:
- a third area and a fourth area, the fourth area being adjacent to the incident face, and overlapped with the second area of the first exiting face in a plan view, and
- a second light-controlling pattern disposed in the fourth area and not disposed in the third area, the second light-controlling pattern guiding the incident light to the third area, the guided light exiting from the second exiting face.

20. The back light assembly of claim 19, wherein the light source comprises a plurality of point light sources.

21. The back light assembly of claim 19, further comprising a first optical member to enhance brightness uniformity of a first light exiting from the first exiting face.

22. The back light assembly of claim 19, further comprising a second optical member to enhance uniformity of brightness of a second light exiting from the second exiting face.

23. The back light assembly of claim 19, further comprising a transflective member to reflect a portion of the second light from the second exiting face and transmit a remaining portion of the second light through the transflective member.

24. The back light assembly of claim 19, wherein the first light-controlling pattern has a plurality of arched patterns arranged in succession when viewed on a plane.

25. The back light assembly of claim 24, wherein a center portion of the arched patterns corresponds to a center portion of the light source.

26. The back light assembly of claim 19, wherein the first light-controlling pattern has a substantially zigzag shape when viewed on a plane.

27. The back light assembly of claim 26, wherein each of vertexes of the zigzag shape corresponds to a center portion of the light source.

28. A display apparatus comprising:
- a first display panel including a first display area to display an image and a first light blocking area to block light; and
- a back light assembly comprising a light source to generate a light and a light guide plate, the light guide plate including:
  - an incident face receiving an incident light provided from an exterior;
  - a first exiting face including:
    - a first area and a second area, the second area being adjacent to the incident face, and being disposed between the incident face and the first area, and
    - a first light-controlling pattern disposed in the second area to guide the incident light to the first area, the guided light by the first light-controlling pattern exiting from the first exiting face; and
  - a second exiting face including:
    - a third area and a fourth area, the fourth area being adjacent to the incident face, and overlapped with the second area of the first exiting face in a plan view, and
    - a second light-controlling pattern disposed in the fourth area and not disposed in the third area, the second light-controlling pattern guiding the incident light to the third area, the guided light exiting from the second exiting face.

29. The display apparatus of claim 28, further comprising a second display panel having a second display area to display the image and a second light blocking area to block the light.

30. The display apparatus of claim 28, further comprising a transflective member to reflect a portion of the second light from the second exiting face and transmit a remaining portion of the second light.

31. The display apparatus of claim 30, further comprising a reflecting member disposed between the transflective member and the second display panel, the reflecting member partially reflecting a light transmitted through the transflective member to the light guide plate, the reflecting member having an opening that has a substantially same size as the second display panel.

* * * * *